United States Patent [19]
Enderle

[11] Patent Number: 6,115,958
[45] Date of Patent: Sep. 12, 2000

[54] HEAD LICE TREATMENT PROTOCOL

[76] Inventor: A. Joy Enderle, 3014 Whitehall La., Wichita Falls, Tex. 76309

[21] Appl. No.: 09/343,155

[22] Filed: Jun. 29, 1999

[51] Int. Cl.⁷ ..................................................... A01M 3/04
[52] U.S. Cl. .............................. 43/136; 43/132.1; 294/25
[58] Field of Search .............................. 43/1, 124, 132.1, 43/136; 2/21, 163; 294/25

[56]              References Cited

U.S. PATENT DOCUMENTS

| | | |
|---|---|---|
| 1,261,706 | 4/1918 | Condley . |
| 2,379,624 | 7/1945 | Chisnell . |
| 3,018,484 | 1/1962 | Koehn ........................................... 2/21 |
| 3,985,383 | 10/1976 | Yonkers ................................... 294/1 R |
| 4,671,303 | 6/1987 | Saferstein et al. ..................... 132/11 R |
| 4,815,232 | 3/1989 | Rawski ....................................... 43/136 |
| 4,819,670 | 4/1989 | Saferstein et al. ...................... 132/156 |
| 4,914,855 | 4/1990 | Sherman ................................... 43/136 |
| 5,348,153 | 9/1994 | Cole ........................................ 206/361 |
| 5,547,665 | 8/1996 | Upton .................................. 424/94.61 |
| 5,628,142 | 5/1997 | Kitterman et al. ........................ 43/114 |
| 5,634,293 | 6/1997 | Mike et al. ............................... 43/136 |
| 5,658,750 | 8/1997 | Sheftel et al. ............................ 435/29 |

*Primary Examiner*—Jack W. Lavinder
*Attorney, Agent, or Firm*—Dennis T. Griggs

[57]              ABSTRACT

A tubular fingertip covering or cot made of latex rubber or other flexible material is coated with a tacky or non-tacky adhesive that may include a pediculicide preparation. After the operator's index finger is inserted into the tubular fingertip covering, a layer or coating of adhesive is applied to the protective covering. During inspection, the infested hair is combed to expose lice and dislodge nits, which are then collected by adhesive contact. Because the adhesive covering is on the fingertip, the protected finger can follow the quick movements of the lice, and can collect and retrieve lice and nits from between hair follicle shafts. The fingertip covering is rolled-up or turned inside-out after use, thereby permanently encapsulating the collected lice and nits for hygienic disposal, without risk of escape or transfer to another host.

15 Claims, 2 Drawing Sheets

HEAD LICE TREATMENT PROTOCOL

BACKGROUND OF THE INVENTION

This invention relates generally to insect pick-up devices, and in particular to a flexible finger covering that utilizes an adhesive coating for collecting lice and nits from an infected person's scalp and hair.

Head lice (*Pediculus capitis*) are small parasitic insects that live on the human scalp and lay eggs in the hair. The head louse is a wingless, active insect that has six legs for fast crawling mobility. Its legs are equipped with powerful claws that are used to cling to the hair shaft. The female louse is approximately 2.4–3.3 mm in length (FIG. 4) and the male is slightly smaller. The whitish-tan nits (eggs) are about 0.8 mm in length (FIG. 5) and are barely visible without magnification.

Despite the availability of modern chemical insecticide treatments and community eradication programs, head lice infestations remain endemic in the U.S. Although head lice are not responsible for the spread of any disease, head lice infestations continue to cause considerable discomfort and social distress. Infestation is acquired mainly by head-to-head contact with an infested person's hair and by sharing towels, hats, pillows, combs, brushes and other grooming accessories. Head lice may also reside temporarily on bed linen and upholstered furniture. The infestation by head lice is known as pediculiasis, and the associated disease is referred to as pediculosis. Chemical treatments directed against lice are referred to as pediculicides.

Head lice derive nutrients by blood feeding at least once each day and cannot survive for more than about two days at room temperature without ready access to a living host. A nymphal louse hatches from its egg after about eight days of development, and begins to feed, grow and develop until it attains the adult form, typically two to three weeks after hatching. A female louse may deposit more than one hundred eggs at a rate of about six eggs per day. Generally, an infested person has fewer than a dozen active lice on the scalp at any time, but may have hundreds of viable, dead and hatched eggs.

The symptoms, if any, of head lice infestation are usually mild, with itching being the main complaint. Occasionally, there may be excoriations and crusting, and secondary bacterial infection with regional lymphodenopathy. Those persons with only a very light infestation (1–5 lice) and those who do not react to the anti-coagulant serum that the louse injects locally as it takes its blood meal may be without symptoms. In such cases, the lice and eggs can be detected only by careful inspection of the scalp and hair. The adult louse is usually found in the hairline at the nape of the neck and behind the ears.

The female louse lays her eggs on a hair follicle shaft within 3–4 mm from the scalp. The oval eggs are firmly attached by an organic cement secretion that resists removal by unmedicated shampoo. The eggs take about a week to hatch, leaving the empty egg shells still attached to the hair shaft. As the hair grows, about 1 cm/month, the nit is shifted farther away from the scalp. Since the hatched nit shells are empty, they are not a source of re-infestation.

Currently, there is no satisfactory method to get rid of an infestation except by chemical treatment. Compounds from several classes of insecticides have been applied as shampoos, cremes and lotions to kill head lice, including cyclodienes, DDT, permethrin, pyrethrin, Malathion, organo-chlorines, pyrethrin and pyrethroid. The active ingredients of these formulations act on the central nervous system of the louse and are inherently toxic to humans as well. Given the toxicity of pediculicides, there is a continuing interest in developing head lice treatment protocols which minimize the use and exposure to potentially toxic compounds, and which can be used effectively for eliminating infestation.

Moreover, because most of the currently available insecticides that are applied topically have an underlying chemical similarity, if resistance develops to one class, it may extend to some degree to all compounds, resulting in difficulty in controlling infestations by chemical means alone. Even if the toxicity of a particular compound is disregarded, many products such as pyrethrin are contraindicated for persons with certain allergies, for example to ragweed and chrysanthemums.

After treatment with an appropriate pediculicide, comb removal of nits may not be sufficient to prevent reinfestation, since most nits are empty eggs. Viable eggs are usually located too close to the scalp to be removed with a comb and are best treated with an insecticide which penetrates the egg and kills the developing nymph. In some instances, a second application of the pediculicide within seven to ten days is recommended in order to kill any lice hatched from eggs that were not killed by the first application.

Because of their miniature size, and because of their location on or close to the scalp, it is easy to overlook some active lice and viable eggs. Although a fine toothed nit comb can be used effectively to scrape and collect some nits and lice from the scalp, some viable nits can be overlooked. Active lice can evade collection and capture and may subsequently be transferred to the skin or clothing of a new host or will reinfest the original host. Consequently, there is a continuing interest in improving the mechanical devices for collecting, capturing and removing nits and lice that remain after chemical treatment.

Mechanical removal of lice and viable nits is the most effective but most time consuming method for follow-on treatment. Conventional mechanical collection devices include combs, brushes and adhesive traps. For example, U.S. Pat. No. 4,815,232 discloses a collector sheath combined with a comb. The collector sheath contains deposits of adhesive in dimpled pockets inside the sheath. As the comb is pulled through the hair, insects such as lice and nits are separated from the hair follicles by the comb, and are collected within the sheath. Some of the insects and eggs are captured by contact with the adhesive deposits. The comb also includes a spring-loaded door which prevents the live insects from escaping from the collection space.

According to U.S. Pat. No. 5,634,293, a "fly swatter" device includes a pair of folded sheets that are coated with adhesive. The sheets are folded back, presenting a pair of adhesive faces for contact with a crawling or flying insect. After use, the folded sheets are pressed together, thus trapping and encapsulating the collected insect for hygienic disposal.

U.S. Pat. No. 4,914,855 discloses an adhesive block that is secured to a handle for trapping insects. Several layers of adhesive sheets are secured to the pick-up face of the block. After use, an adhesive strip with a trapped insect is pulled off for disposal.

U.S. Pat. No. 5,628,142 discloses a roller device including a layer of adhesive for attracting and trapping insects.

BRIEF SUMMARY OF THE INVENTION

The present invention consists essentially of a tubular fingertip covering or cot made of latex rubber or other flexible material that is coated with a tacky or non-tacky adhesive that may include a medicated preparation. The tubular fingertip covering is intended for pesticide-free lice and nit removal and optionally as a medicated device to immobilize, kill, remove and safely dispose of lice and nits. The fingertip covering prevents personal contact with the lice and nits, and avoids personal exposure to pesticides during collection and removal of lice and nits.

A layer or coating of adhesive deposited on the fingertip covering traps lice and lice eggs upon contact. Preferably, only the end portion of the fingertip covering is coated with an adhesive preparation. An operator inspecting for lice manipulates the adhesive fingertip covering to trap, collect and retrieve lice and nits from between hair follicle shafts. Because the protective covering is on the fingertip, the covered finger can follow the quick movements of the lice. When contacted by the adhesive, the lice adhere to the fingertip covering and have little or no chance to escape.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1:
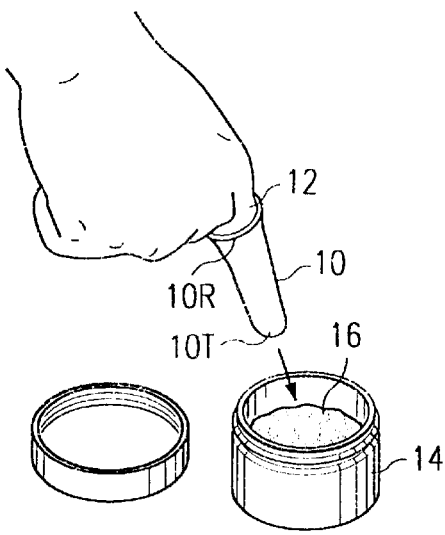
FIG. 1 is perspective view which illustrates the application of an adhesive coating onto a finger cot.

The invention will now be described with reference to a preferred embodiment showing how the invention can best be made and practiced. Like reference numerals are used throughout the description and several views of the drawing to indicate like or corresponding parts.

The head lice treatment protocol of the present invention includes one or more applications of an appropriate pediculicide by shampoo, creme rinse or mousse followed by thorough rinsing, combing, inspection and adhesive collection. A typical post-application collection protocol includes applying a damp towel to the scalp for 30–60 minutes or soaking the scalp and hair in equal parts of water and white vinegar, and then applying a damp towel soaked in the same solution for 15 minutes. Then, the hair is combed and parted, using a fine-toothed nit comb. The hair is back-combed toward the scalp to expose lice and dislodge viable eggs for adhesive collection.

Figure 2:
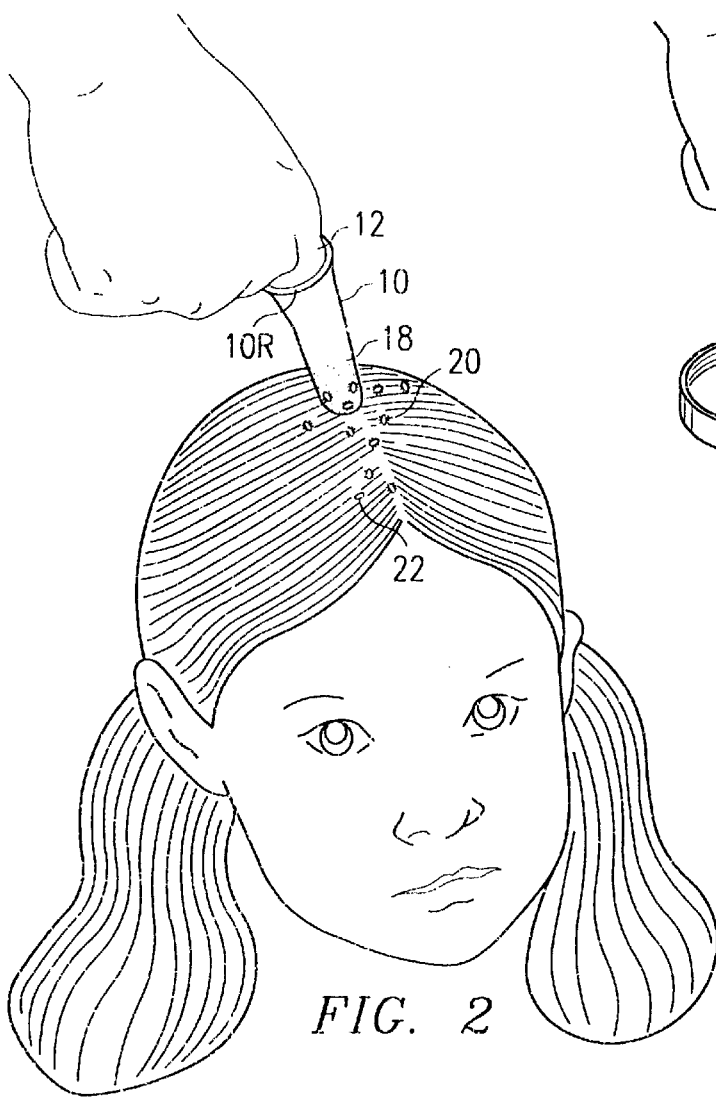
FIG. 2 is a perspective view which illustrates the collection of lice and nits by the adhesively-coated finger cot.
Figure 3:
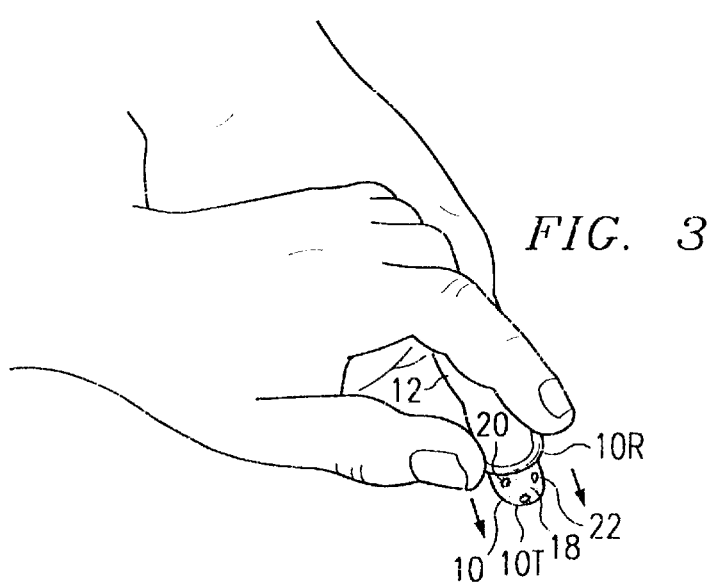
FIG. 3 is a perspective view which illustrates the encapsulation and disposal of collected lice and nits.
Figure 4:
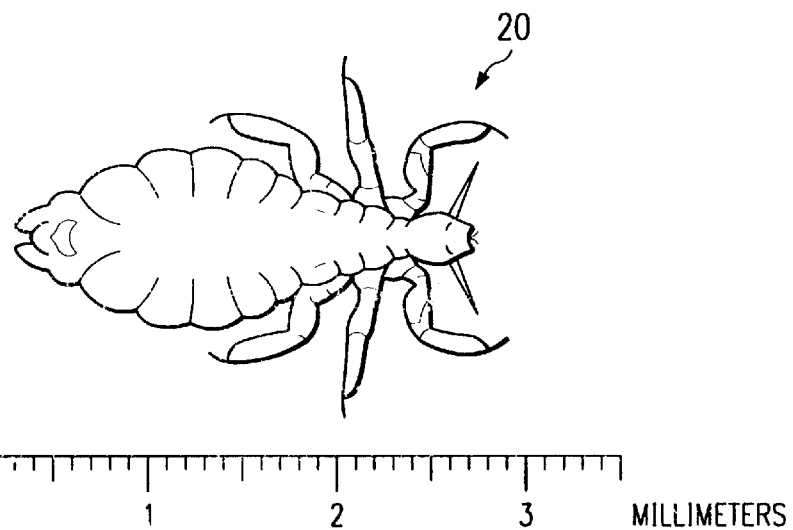
FIG. 4 is an enlarged view of an adult head louse (*Pediculus capitis*)
Figure 5:
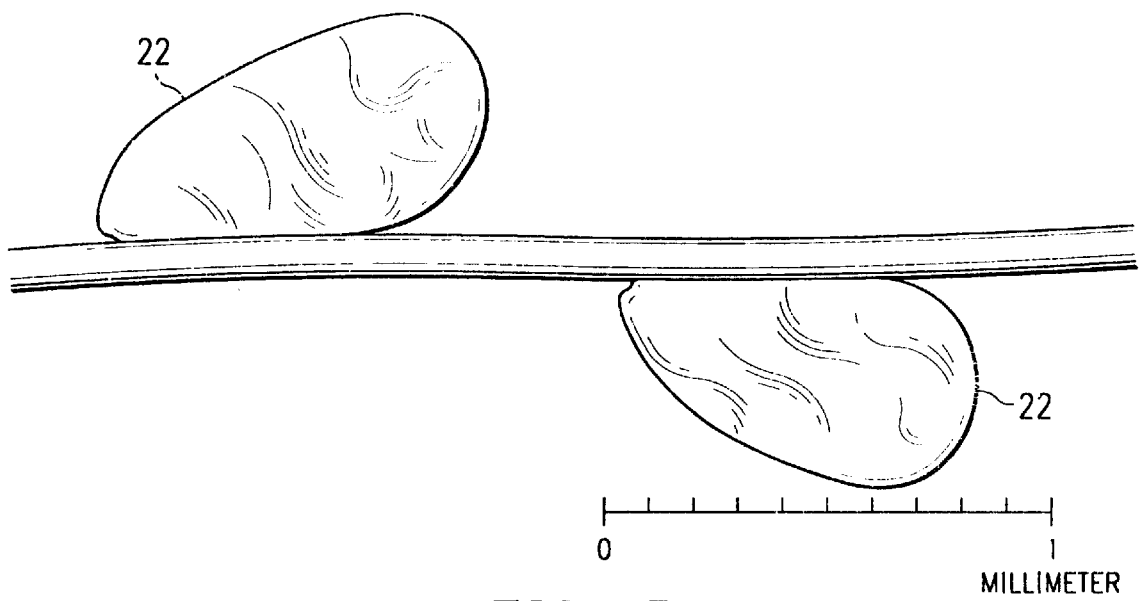
FIG. 5 is an enlarged view of two nits attached to a human hair shaft.

Lice, viable eggs and nit shells are then collected and removed from the scalp and hair with an adhesively-coated finger covering or cot 10 as shown in FIG. 1, FIG. 2 and FIG. 3. An operator rolls or pulls the protective cot 10 onto the operator's finger 12 until at least the fingertip joint is covered. The operator then dips the protected finger into a container 14 of adhesive material 16 to produce an adhesive coating 18 on at least the fingertip portion 10T of the protective cot.

Preferably, the protective cot 10 is a tubular sheath made of a flexible, elastic material such as latex rubber. The tubular sheath includes an open end portion 10R in which the operator's finger is inserted, and a closed fingertip end portion 10T. In the preferred embodiment illustrated in FIG. 1, the adhesive material is a tacky adhesive supplied in a re-sealable container 14. According to that arrangement, the tacky adhesive coating 18 is applied by dipping and spreading over the fingertip end portion after operator's finger has been inserted inside the cot, immediately prior to use.

Optionally, the adhesive material 16 may comprise a non-tacky adhesive that is pre-applied to the fingertip end portion 10T and packaged within a sealed foil container so that it can be safely stored and available for later use. In this optional embodiment, the finger cot 10 with a non-tacky adhesive coating is supplied in a partially rolled-up condition. After removing the cot from the foil container, the operator inserts her finger into the open end and unrolls the open end 10R along the finger until the non-tacky adhesive coating is fully exposed.

By applying light finger pressure, the operator contacts the exposed lice 20 and nits 22 with the adhesive coating 18 on the fingertip end 10T of the cot. After all visible lice and nits have been collected, the operator rolls the cot 10 along the finger toward the fingertip 10T until the collected lice and nits are encapsulated within the convoluted roll 10R. Optionally, the operator rolls or pulls the cot along the finger until the cot is turned inside-out, and the lice and nits are encapsulated within the everted cot.

It may be necessary to remove one or more nits in the traditional fashion with the operator's fingernail or a nit comb. If so, the collected nits can be transferred from the operator's fingernail or nit comb to the adhesive coating 18. For this purpose, the protective cot 10 can be worn on a finger of the operator's left hand, while the operator's right hand is used to manipulate a nit comb or a fingernail for removing and collecting nits. Optionally, the nits collected on a fingernail or comb can be deposited directly onto an adhesive coating on a separate cardboard collection sheet.

Rinsing, combing, inspecting and adhesive collecting are repeated daily until no visible evidence of infestation remains. Full treatment with a medicated shampoo or topical creme is repeated at seven to ten day intervals until no visible evidence of infestation remains. If treatment failure should occur, as indicated by the presence of live lice on the next day following initial treatment, treatment with an alternative pediculicide is recommended.

After all visible lice and nits have been collected, the fingertip covering is rolled-up or everted and removed, thereby permanently encapsulating the collected lice and nits for convenient disposal, without risk of escape or transfer to another host. These results are not always obtained by comb devices, which operate only by a scraping and displacing action. Fugitive lice can easily escape from a comb onto the hands or clothing of the operator, and thus can be re-introduced to the infested person or transferred to a new host.

One advantage of the adhesive fingertip covering 10 as compared to a conventional nit comb or adhesive pick-up devices as described in the prior art is that the fingertip covering can be quickly manipulated to follow the rapid movements of the lice, and can also be inserted between the hair follicle shafts for collection by adhesive contact with those nits which are likely to be missed by conventional comb devices, and capture fugitive lice which are likely to evade the comb.

A further advantage is that the fingertip cot limits skin contact and personal exposure to the adhesive preparation, which may be medicated, since the amount of adhesive coating on the fingertip covering and its application can be carefully controlled and limited. Finally, the adhesive fingertip covering, after collecting several lice and nits, can be rolled-up or turned inside-out (everted), thereby encapsulating the lice and nits for safe, hygienic disposal.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. Apparatus for collecting lice from an infested person's scalp and hair comprising, in combination:

a finger covering including an open end portion and a closed fingertip end portion; and, an adhesive material disposed on the fingertip end portion, said adhesive material including a pediculicide preparation mixed with the adhesive material.

2. Apparatus for collecting lice as set forth in claim 1, wherein the finger covering comprises a tubular sheath or cot made of a flexible material.

3. Apparatus for collecting lice as set forth in claim 1, wherein the finger covering comprises latex rubber.

4. Apparatus for collecting lice as set forth in claim 1, wherein the adhesive material comprises a tacky adhesive that is spreadable over the finger covering to provide an adhesive coating on the fingertip end portion.

5. Apparatus for collecting lice as set forth in claim 1, wherein the adhesive material comprises a non-tacky adhesive deposit.

6. A method for use by an operator for collecting lice and nits from an infested person's scalp and hair comprising:

(a) covering the operator's finger with a cot;

(b) applying a coating of adhesive material onto the fingertip portion of the cot; and, (c) contacting lice and nits with the adhesive coating.

7. The method as set forth in claim 6, including the step of rolling the flexible cot along the operator's finger toward the fingertip portion, thereby encapsulating the collected lice or nits within the rolled cot.

8. The method as set forth in claim 6, including the step of moving or rolling the cot along the operator's finger until the cot is turned inside-out and the collected lice or nits are encapsulated within the everted cot.

9. The method as set forth in claim 6, including the step of parting the hair with a comb or brush to expose the lice and nits.

10. The method as set forth in claim 6, including the step of applying a damp towel to the infested scalp and hair.

11. The method as set forth in claim 6, including the step of soaking the infested scalp and hair in equal parts of water and white vinegar, and then applying a damp towel soaked in the same solution.

12. A method for use by an operator to remove lice and nits from an infested person's scalp and hair comprising the steps:

(a) contacting lice or nits with an adhesively coated cot; and, (b) turning the cot inside-out while encapsulating the collected lice and nits within the everted cot.

13. The method as set forth in claim 12, wherein the turning step is performed by rolling the cot along the operator's finger, thereby encapsulating the collected lice and nits within the convoluted roll.

14. A kit sold as a specific remedy for use by an operator for collecting lice and nits from an infested person's scalp and hair comprising, in combination:

a tubular sheath or cot made of a flexible material for covering the operator's finger;

a container including a reservoir for storing a quantity of adhesive material; and, a deposit of adhesive material disposed in the reservoir.

15. A kit as set forth in claim 14, wherein the container is a resealable container having an access opening for permitting the insertion of the operator's covered finger into the adhesive reservoir.

\* \* \* \* \*